US012729788B1

(12) United States Patent
Cox

(10) Patent No.: US 12,729,788 B1
(45) Date of Patent: Sep. 8, 2026

(54) DUAL-FLOW AIR CHUCK ASSEMBLY

(71) Applicant: Christopher Cox Creative, Park City, UT (US)

(72) Inventor: Christopher Paul Cox, Park City, UT (US)

(73) Assignee: Christopher Cox Creative, Park City, UT (US)

( * ) Notice: Subject to any disclaimer, the term of this patent is extended or adjusted under 35 U.S.C. 154(b) by 0 days.

(21) Appl. No.: 19/320,847

(22) Filed: Sep. 5, 2025

(51) Int. Cl.
*F16L 37/086* (2006.01)
*F16L 37/35* (2006.01)
*B60S 5/04* (2006.01)

(52) U.S. Cl.
CPC ............. *F16L 37/086* (2013.01); *F16L 37/35* (2013.01); *B60S 5/04* (2013.01); *Y10T 137/3724* (2015.04)

(58) Field of Classification Search
CPC ......... F16L 37/086; F16L 37/35; F16L 37/32; Y10T 137/3724; Y10T 137/3584
See application file for complete search history.

(56) References Cited

U.S. PATENT DOCUMENTS 2,837,350 A * 6/1958 Druge ..................... F16K 15/20 285/17
4,182,370 A * 1/1980 Karcher .................. F16L 37/32 137/614.04
4,378,028 A * 3/1983 Weber ..................... F16L 37/23 137/614.04
4,398,561 A * 8/1983 Maldavs ................. F16L 37/23 251/149.6
5,080,132 A * 1/1992 Manz .................. F16L 37/1215 251/149.6
5,975,109 A * 11/1999 Wu ........................... B60S 5/04 137/231
6,105,600 A * 8/2000 Wang ........................ B60S 5/04 137/231
7,032,613 B2 * 4/2006 Delorme ............... F04B 33/005 137/231
7,073,773 B2 * 7/2006 Nuttall ..................... F16L 37/33 251/149.6
7,624,752 B2 * 12/2009 Huang .................. F16K 15/207 137/228
7,866,335 B2 * 1/2011 Wang .................... F04B 33/005 137/231
8,156,955 B2 * 4/2012 Wang ...................... F16K 15/20 137/231

(Continued)

*Primary Examiner* — David Colon-Morales
(74) *Attorney, Agent, or Firm* — Christensen O'Connor Johnson Kindness PLLC

(57) ABSTRACT

A dual-flow air chuck assembly for delivering pressurized gas to a valve stem is provided. The assembly includes a main body, a shuttle having a tip portion configured to interface with a poppet of the valve core, a closed-flow spool or an open-flow spool, and a biasing spring to bias the shuttle and spool toward an end that interfaces with the valve stem. The biasing spring can be stronger than a spring biasing the poppet of the valve core such that pushing the assembly onto the valve stem moves the poppet to an open position before the shuttle and spool translate axially. The air chuck assembly can have primary sealing O-rings positioned against the valve stem when the air chuck is installed, with a sealing force against the valve stem based on pressure differential of the gas within the air chuck and the atmosphere past threads of the valve stem.

30 Claims, 12 Drawing Sheets

(56) References Cited

U.S. PATENT DOCUMENTS

| | | | | |
|---|---|---|---|---|
| 8,402,987 | B2 * | 3/2013 | Wang | B60S 5/043 251/149.1 |
| 8,720,474 | B2 * | 5/2014 | Wang | F04B 33/00 137/231 |
| 9,206,916 | B1 * | 12/2015 | Wang | F04B 33/00 |
| 9,249,914 | B2 * | 2/2016 | Kuo | F16L 37/1215 |
| 9,511,636 | B2 * | 12/2016 | Kuo | B60C 29/06 |
| 9,989,180 | B2 * | 6/2018 | Wang | B60S 5/04 |
| 11,046,129 | B2 * | 6/2021 | Chou | B60C 29/064 |
| 11,209,091 | B2 * | 12/2021 | Wu | F16K 11/07 |
| 11,655,924 | B2 * | 5/2023 | Ramaswamy | F16L 29/04 251/149.6 |
| 11,718,276 | B2 * | 8/2023 | Lin | F04B 33/005 137/231 |
| 11,913,582 | B2 * | 2/2024 | Lusso | F16L 37/35 |
| 12,319,102 | B2 * | 6/2025 | Wu | B60C 29/06 |
| 2005/0000568 | A1 * | 1/2005 | Nikolayev | F16L 37/23 137/231 |
| 2009/0229677 | A1 * | 9/2009 | Wang | F04B 33/005 137/231 |

* cited by examiner

DUAL-FLOW AIR CHUCK ASSEMBLY

BACKGROUND

Inflation chucks (e.g., air chucks) are widely used in conjunction with compressors, tire inflators, and/or pressure-holding tanks to deliver pressurized gas into pneumatic tires and other inflatable articles. A typical air chuck attaches to a valve stem, commonly a Schrader or Presta valve stem, and provides a temporary sealed connection through which pressurized gas (air, nitrogen, etc.) can flow. Air chucks are employed in a broad range of applications, including automotive service centers, gas stations, industrial facilities, and home workshops.

Conventional air inflation chucks are available in several configurations, such as clip-on, screw-on, and push-on styles. While these devices generally perform the intended function of transferring pressurized air through the valve stem into the pressure vessel (e.g., a tire), each type presents certain limitations in ease of use, inflation speed, air leakage, consistency of pressure gauge readings, and compatibility with various pressure hose types. Clip-on air chucks offer a balance between speed and security on the valve stem, but their locking mechanisms can wear out or fail to maintain a proper seal under pressure, resulting in air leakage or incomplete inflation. Screw-on designs provide a secure connection to the valve stem but can become stuck on the threads of the valve stem, and can be inconvenient and time-consuming to attach and detach, particularly in high-volume service environments. Push-on air chucks are generally the easiest to use, but are prone to gas leakage during inflation, requiring continuous manual pressure and precise axial alignment to maintain a seal, which leads to operator fatigue and inconsistent inflation.

Additional challenges arise from durability and compatibility of air inflation chucks. Many conventional air chucks are prone to wear or damage in demanding environments, particularly when exposed to dirt and moisture typically present on vehicle tire valve stems, and become functionally unreliable after heavy use. Further, conventional air chucks are typically either open-flow (for use with inflation systems having a manual control to deliver the pressurized air) or closed-flow (for use with inflation systems where the air chuck has a direct connection to pressurized air without a manual control valve), and cannot be converted. Accordingly, a different chuck type is necessary for each type of inflation system. Safety can pose another concern, as accidental disconnection under high pressure can lead to sudden air release, posing risks to both the operator and the equipment. The embodiments of the present disclosure are expected to address these and other needs.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1A:
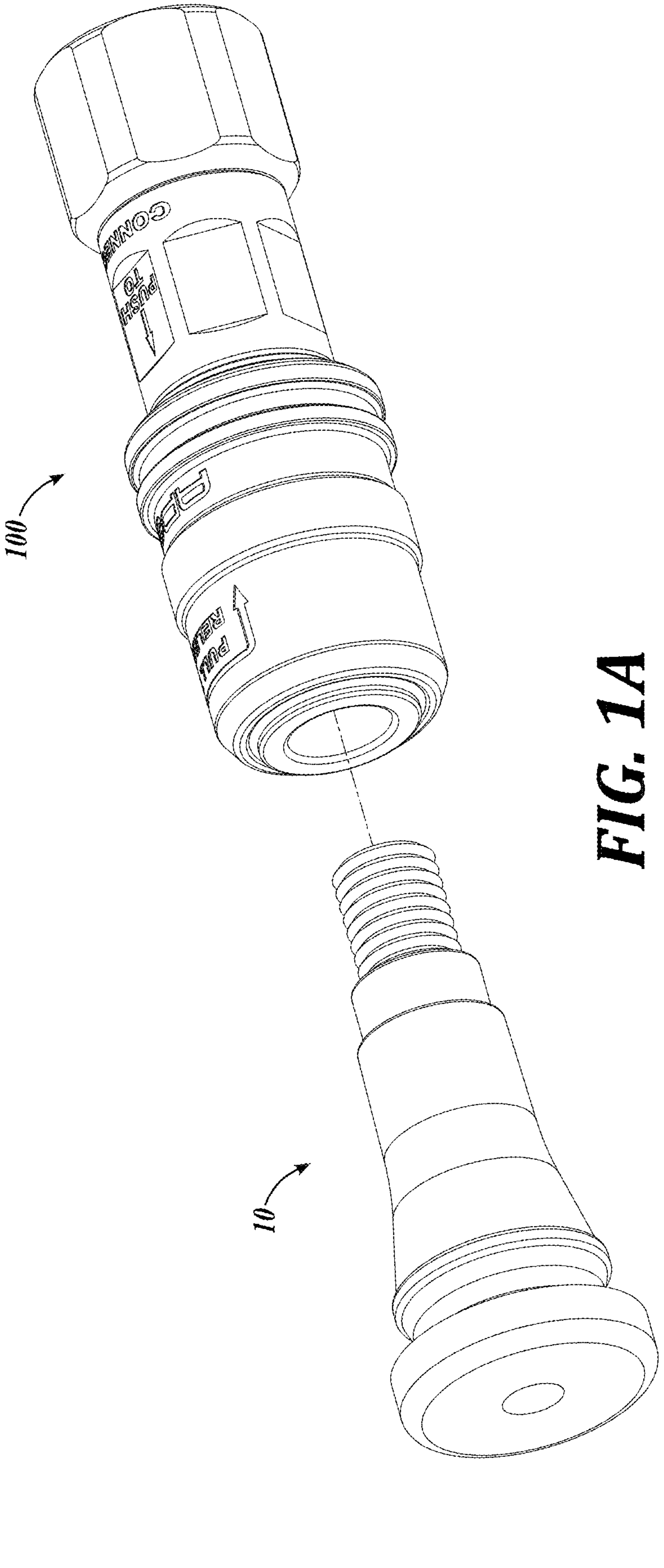
FIGS. 1A and 1B are perspective assembled and exploded views, respectively, of a dual-flow air chuck assembly, depicted in a closed-flow configuration in accordance with embodiments of the present disclosure.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

The present disclosure relates to "push-to-connect" air chuck assemblies for coupling to and delivering pressurized gas to a valve stem, such as a Schrader valve stem for vehicle tire inflation. Embodiments of the air chuck assemblies are expected to deliver the pressurized air at a higher flow rate relative to conventional air chucks, can be automatically locked in place when pressed onto the valve stem at a relatively low attachment force, have a seal configuration that can accommodate off-axis alignment of the air chuck with the valve stem, have a sliding release collar, and can be convertible between open-flow and closed-flow operation, among other features and advantages. As used herein, the term "dual-flow" is intended to refer to embodiments of the air chucks of the present disclosure that can be converted between open-flow and closed-flow operation. In this regard, the air chucks disclosed herein can include components that can be adapted to transition operation from closed- to open-flow, or vise versa. In some embodiments, one or more internal flow-path components can be exchanged to transition the air chuck operation between open-flow and closed-flow, or a component of the air chuck can be placed into first position where the air chuck is in either open- or closed-flow, and a second position where the air chuck is in the other of open- or closed-flow.

Open-flow operation of an air chuck permits airflow freely from a pressurized gas source through the air chuck to a valve stem interface portion of the air chuck, even when the air chuck is not connected to a valve stem. Open-flow operation is generally intended for tire inflators, gauges, and other air inflation systems where the pressurized airflow is controlled, e.g., by a finger-actuated switch, a foot pedal, etc. In use, open-flow operation of the air chucks of the present disclosure permit the use of a tire pressure gauge while inflating the tire. Contrastingly, closed-flow operation of an air chuck prevents airflow through the air chuck unless the air chuck is connected to a valve stem. Closed-flow operation is generally intended for direct connection to a pressurized air line (e.g., an air compressor, a pressurized air tank, etc.) without a manual control valve. In this regard, the airflow is only permitted when a sealed connection to the valve stem is made, and flow is stopped when the air chuck is disconnected, thereby preventing pressurized air from escaping when not actively inflating a tire or other article. As used herein, the term "air" is intended to refer to any suitable pressurized gas for delivery through a valve stem, such as air, nitrogen, helium, oxygen, argon, etc. and should not be limited to only chucks for use with pressurized atmospheric air. Accordingly, the embodiments of the present disclosure can be configured for use with any suitable pressurized gas transfer to a valve stem.

In use, the air chucks of the present disclosure interface with the valve core of the valve stem to ensure the internal valve is fully open during operation, ensuring the maximum air flow rate through the valve. In some embodiments, the air chuck has a two-stage operation as the air chuck is pressed onto the valve stem. In the first stage, the shuttle tip of the air chuck engages a poppet of the valve core, axially translating the poppet to the fully open position and causing the seal configuration of the air chuck to engage an end of the valve stem. After the poppet is fully open, in the second stage, further insertion of the valve stem into the air chuck causes an internal spool to translate axially, which in closed-flow operation, opens a flow-path between the air pressure source and the inflation chamber (e.g., the internal chamber of a tire). As will be explained in greater detail below, the two-stage operation is permitted by a sealing spring having more spring force than the spring in the valve core of a Schrader valve, ensuring the poppet of the valve core bottoms out at the fully open position before the spool is translated, opening airflow through the air chuck. In open-flow operation of the air chuck, the second stage described above does not affect the airflow through the air chuck; however, the first stage still ensures that the poppet of the valve core is fully open and a seal is created to prevent air leaking out of the air chuck.

The "push-to-connect" operation of the air chucks of the present disclosure permits an automatic removable coupling to the valve stem when the air chuck is pressed onto the valve stem. To ensure the air chuck does not release from the valve stem until unlocked by the user, a plurality of slidable teeth engage threads on an outer surface of the valve stem. As will be described below, the slidable teeth can be disengaged to release the air chuck after the inflation operation. The biasing forces in the air chuck can be specified such that a relatively low attachment force is required to engage the teeth with the threads of the valve stem and fixedly couple the air chuck to the valve stem until removed. In this regard, embodiments of the present disclosure are expected to prevent inadvertent detachment of the air chuck during operation.

The air chucks of the present disclosure include a seal configuration that can accommodate off-axis alignment of the air chuck with the valve stem. Conventional press-on type air chucks are sensitive to the angle of the chuck with respect to the valve stem, requiring precise alignment by the user to maintain a seal between the air chuck and the valve stem. The embodiments disclosed herein have sealing members (e.g., o-rings) that are configured to shuttle toward the end of the valve stem in response to a pressure differential between the pressure in the inflation chamber and the atmosphere, creating a seal that can be maintained at off-axis positions of the air chuck with respect to the valve stem. In this regard, the sealing members are permitted to tilt within their retaining bore, which can maintain the seal with the valve stem if the air chuck is axially tilted.

Once the "push-to-connect" coupling is engaged, the air chuck can be released from the valve stem by translating a sliding release collar away from the valve stem, operably releasing the teeth from the threads of the valve stem and releasing the air chuck. The sliding release collar can be operable with a single hand of a user, for ease of use during operation.

As set forth above, the air chucks disclosed herein can include components that can be adapted to transition operation from closed- to open-flow, or vise versa. In some embodiments, internal flow-path components can be exchanged to transition the air chuck operation between open-flow and closed-flow, such as by exchanging a closed-flow spool for an open-flow adapter (compare FIGS. 2A-2C (closed-flow) with 5A-5C (open-flow)). As will be shown below, the air chuck assemblies of the present disclosure can be at least partially disassembled to access internal flow-path components for transition between open- and closed-flow. In other embodiments, a component of the air chuck can be placed into first position where the air chuck is in either open- or closed-flow, and a second position where the air chuck is in the other of open- or closed-flow, such as by threadingly translating a dual-flow collar between a first and a second position (see FIGS. 6A and 6B)

Figure 1B:
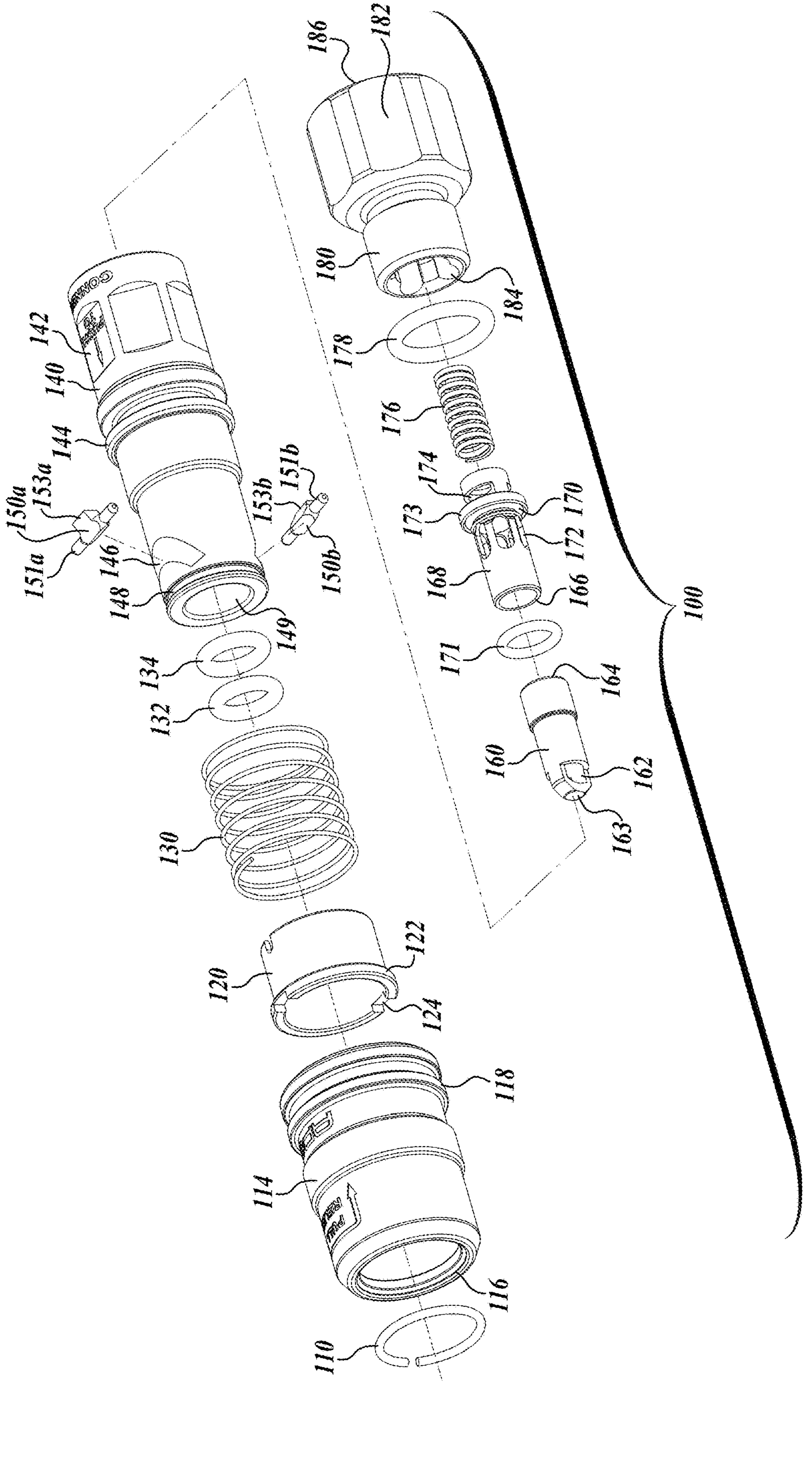

FIGS. 1A and 1B are perspective assembled and exploded views, respectively, of a dual-flow air chuck assembly 100 (the "assembly 100"), depicted in a closed-flow configuration, in accordance with embodiments of the present disclosure. The assembly 100 is configured to interface with a valve stem 10, such as a Schrader or Presta valve stem, to deliver pressurized gas to the valve stem 10, filling an article coupled to a body portion 12 of the valve stem 10 (e.g., inflating a tire, tube, or other inflatable article, filling a pressure vessel, etc.). Closed-flow operation of the assembly 100 prevents airflow through the assembly 100 unless connected to the valve stem 10. Closed-flow operation is generally intended for direct connection to a pressurized air line (e.g., an air compressor, a pressurized air tank, etc.) without a manual control valve. Although Schrader valve stems are shown in the FIGURES, the embodiments disclosed herein may be adapted for use with other types of valve stems, and should not be construed as limited to interfacing exclusively with Schrader valve stems.

As shown in FIG. 1A, in use, the assembly 100 can be axially aligned with the valve stem 10 and form a sealed attachment, as will be described in greater detail below, to permit gas flow through the assembly 100, through a valve core 20 (see FIG. 2A) of the valve stem 10, and into the article coupled to the valve stem 10. In this regard, the assembly 100 is a "push-to-connect" type of air chuck, where pressing the assembly 100 over the open end of the valve stem 10 automatically forms a releasable coupling to ensure leak-free airflow therebetween. This type of air chuck does not require rotation of the assembly 100 to engage the threads of the valve stem 10, nor manipulation of a component (e.g., a locking lever) to form the coupling. The releasable coupling is intended to maintain a connection between the components at least when subjected to the forces of the pressurized gas flowing therebetween. As will be described below, the coupling between the assembly 100 and the valve stem 10 can be released by pulling rearward on a sliding release collar 114, and removing the assembly 100.

Figure 2A:
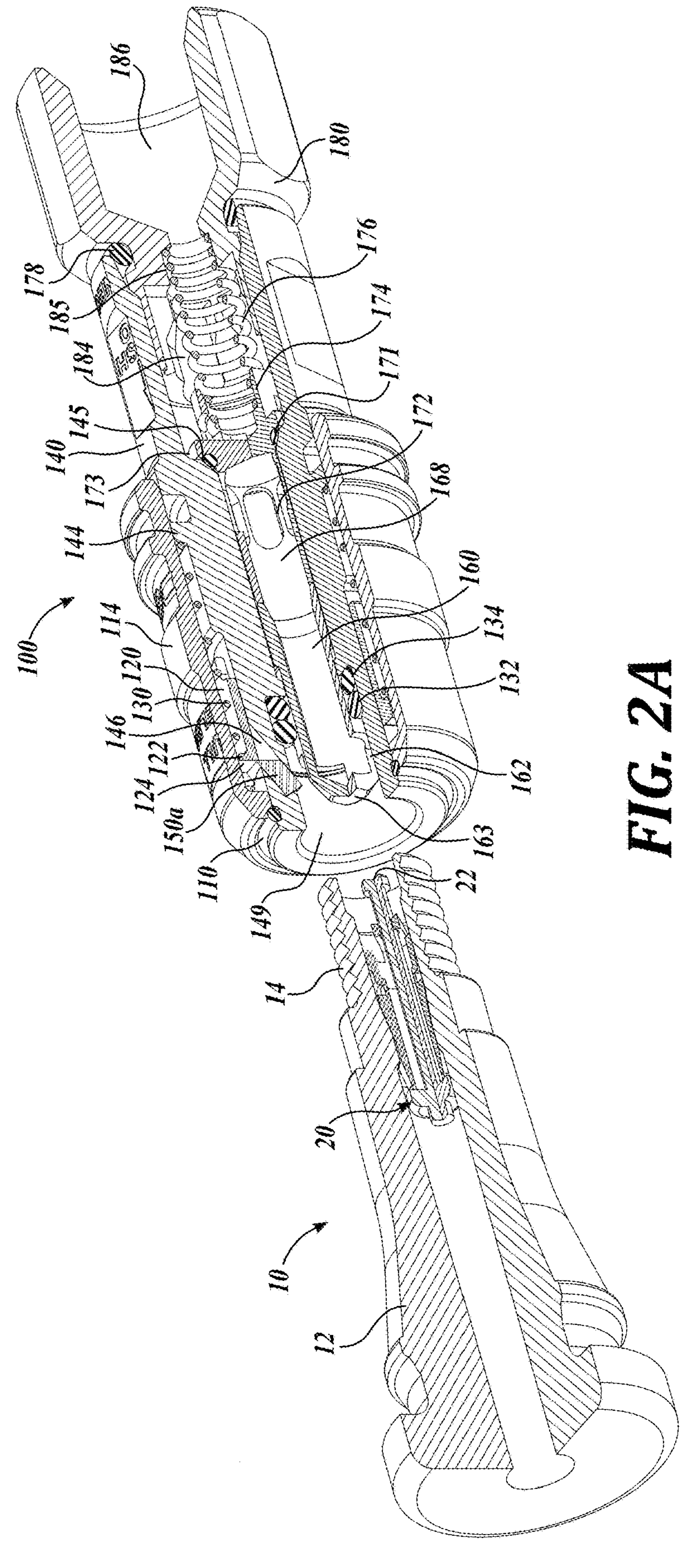
FIGS. 2A-2C are cross-sectional perspective views of the dual-flow air chuck assembly of FIG. 1, with a 90° section taken axially, and shown with a Schrader valve stem.
Figure 2B:
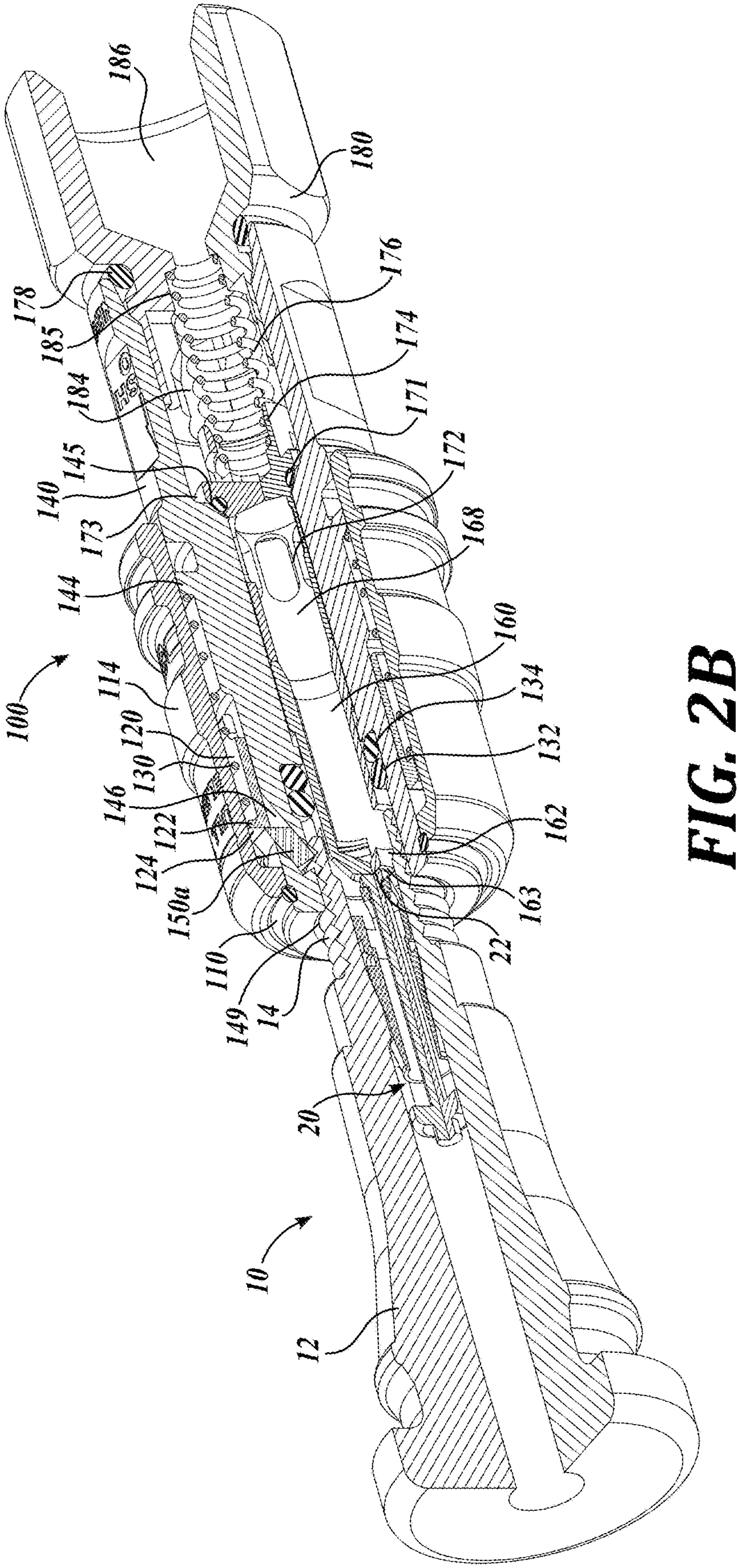
Figure 2C:
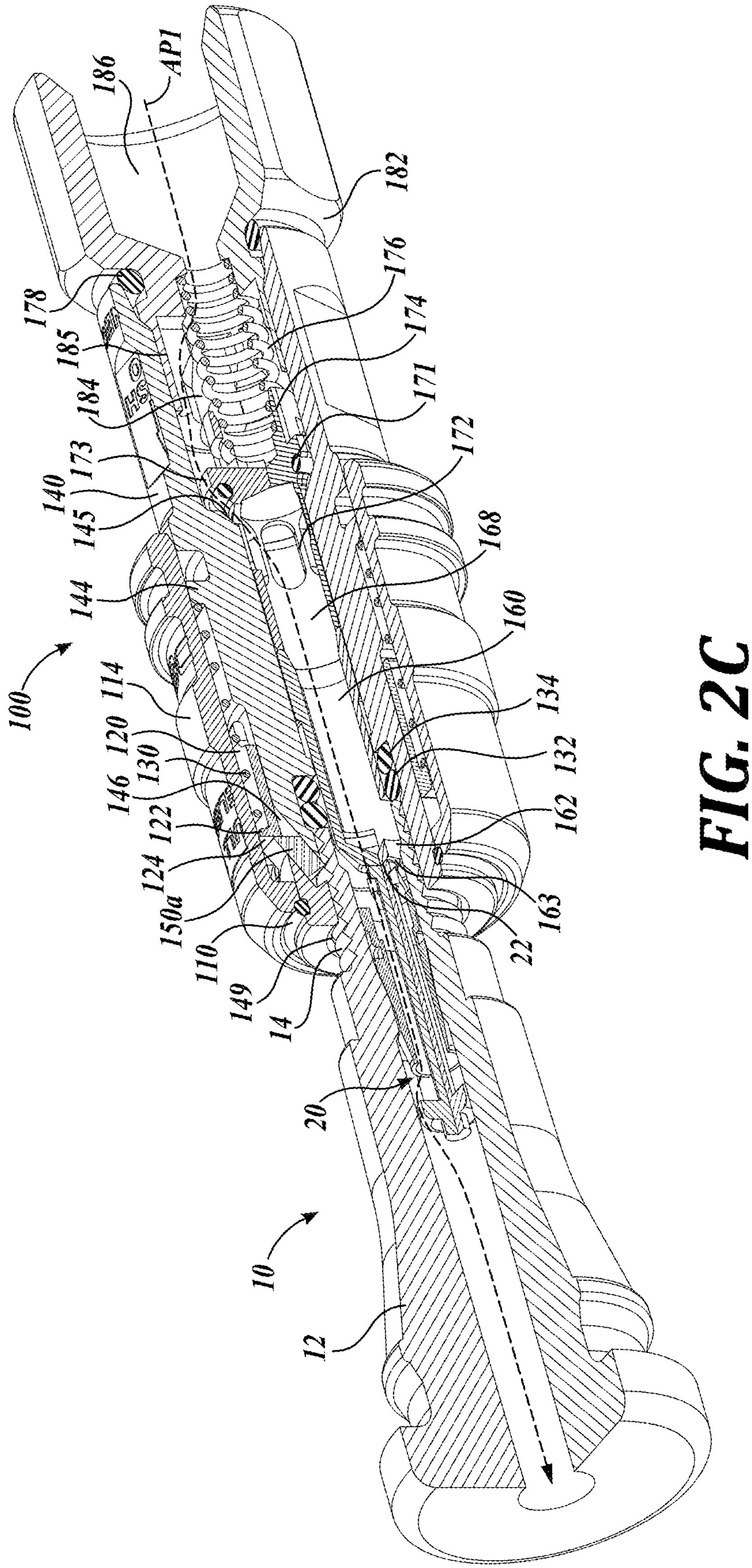

FIGS. 2A-2C are cross-sectional perspective views of the assembly 100, with a 90° section taken axially, and shown with the valve stem 10. Referencing FIGS. 2A-2C in view of FIG. 1B, the components of the assembly 100 will now be described in detail. The assembly 100 includes a main body 140 over which the sliding release collar 114 is fitted. The sliding release collar 114 can be retained on the main body 140 by a retaining ring 110 that is received within a retaining groove 148 on the main body 140, and interfaces with a retaining ring indent 116 on the sliding release collar 114. In this regard, the sliding release collar 114 is permitted to slide rearward toward a fitting portion 182 (e.g., in the direction of arrow R1 of FIG. 3A), but is prevented from translating forward off of the main body 140. As can be seen in FIGS. 2A-2C, rearward movement of the sliding release collar 114 is restricted by interference of internal components of the assembly 100 and the main body 140. The sliding release collar 114 can include one or more gripping ribs 118 to assist the user in translating the sliding release collar 114 rearward to release the assembly 100 from the valve stem 10. The sliding release collar 114 is biased forward by a collar biasing spring 130, extending between a spring retaining sleeve 120 and a spring seat 144 of the main body 140. The spring retaining sleeve 120 is positioned around a portion of the main body 140 and within the sliding release collar 114, and can have a lip 122 extending radially outward and configured to retain the collar biasing spring 130.

Figure 3A:
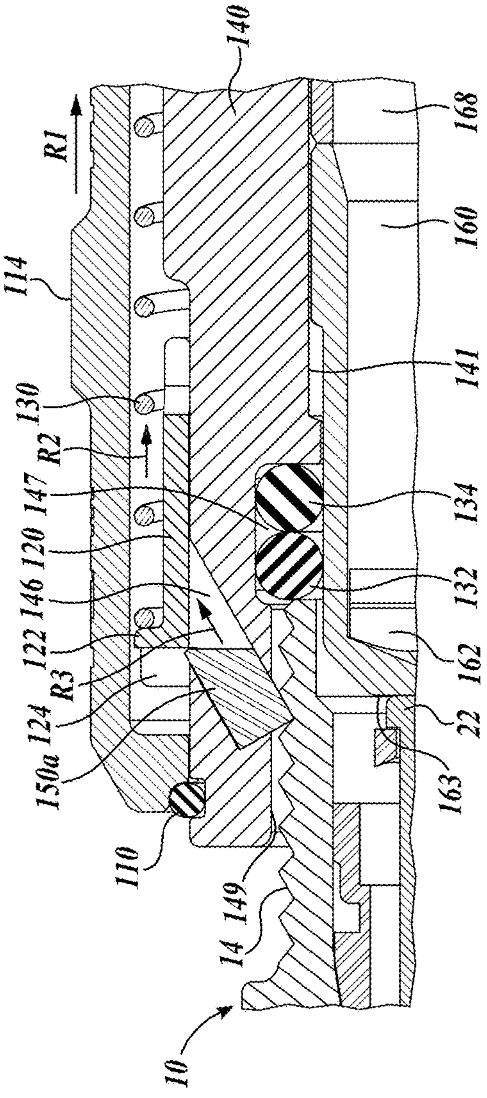
FIGS. 3A and 3B are cross-sectional side views of a portion of the dual-flow air chuck assembly of FIG. 1, showing a releasable locking tooth interfacing with threads of a Schrader valve stem.
Figure 3B:
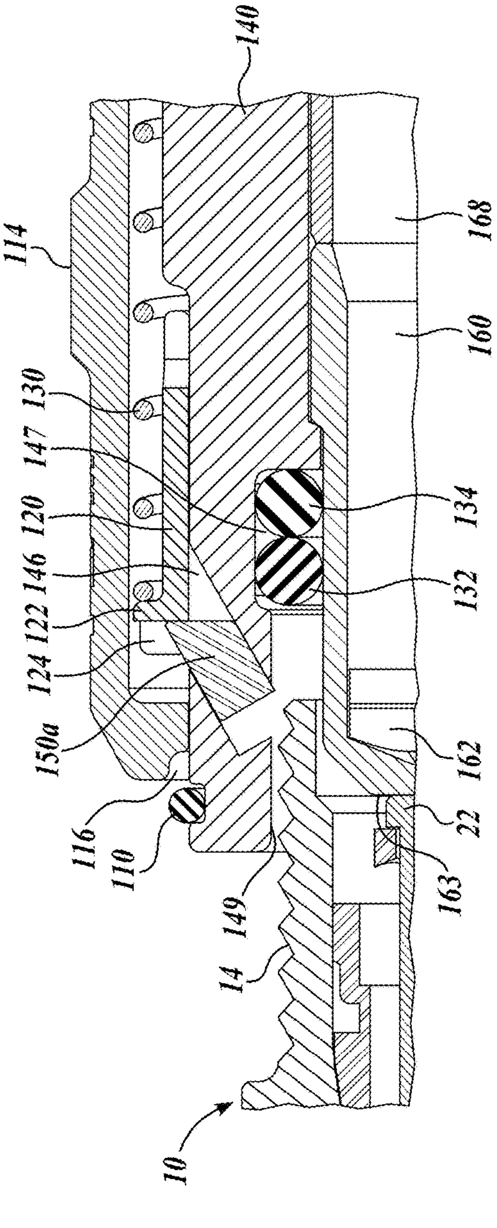

The main body 140 can include a pair of angled slots 146 in which first and second locking teeth 150*a* and 150*b*, respectively, are configured to slide radially inward and forward to interface with threads 14 (see FIG. 3A) of the valve stem 10 to couple the assembly 100 to the valve stem 10, and radially outward and rearward (in the direction of arrow R3 of FIG. 3A) to release the assembly 100 from the valve stem 10 as shown in FIG. 3B. In the assembled configuration shown in FIGS. 2A-2C, the spring retaining sleeve 120 is positioned rearward of the first and second locking teeth 150*a* and 150*b* along the main body 140, such that first and second anti-rotation protrusions 153*a* and 153*b* of the first and second locking teeth 150*a* and 150*b*, respectively, are received within anti-rotation slots 124 of the spring retaining sleeve 120. In use, the interface between the angled slots 146, the first and second anti-rotation protrusions 153*a* and 153*b*, and the anti-rotation slots 124 locks the rotational position of the spring retaining sleeve 120 with respect to the main body 140. This alignment configuration promotes smoother travel of the first and second locking teeth 150*a* and 150*b* within the pair of angled slots 146, as misalignment of the teeth can cause binding within the slots, leading to inconsistent function of the assembly 100 during use.

Each of the first and second locking teeth 150*a* and 150*b* further includes a pair of lateral pins 151*a* and 151*b*, respectively, that are configured to extend outside of the angled slots 146 and to abut the lip 122 of the spring retaining sleeve 120 in the assembled configuration. In this regard, as the collar biasing spring 130 imparts a force against the spring retaining sleeve 120 through the lip 122 in the forward direction, the first and second locking teeth 150*a* and 150*b* are translated by the biasing force forward to the radially inward-most position within the angled slots 146, wherein the first and second locking teeth 150*a* and 150*b* protrude a maximum distance into a first end portion opening, valve stem interfacing opening 149 of the main body 140. In this position, the first and second locking teeth 150*a* and 150*b* are configured to engage the threads 14 of the valve stem 10 to releasably couple the assembly 100 thereto, such as in the position shown in FIG. 3A. Forward translation of the spring retaining sleeve 120 based on the biasing force of the collar biasing spring 130 is constrained by the lateral pins 151*a* and 151*b* against the lip 122 and the first and second locking teeth 150*a* and 150*b* within the angled slots 146.

FIGS. 3A and 3B are cross-sectional side views of a portion of the assembly 100, showing the first and second locking teeth 150*a* and 150*b* interfacing with the threads 14 of the valve stem 10. Returning to the functionality of the sliding release collar 114, in the forwardmost position of the first and second locking teeth 150*a* and 150*b*, an internal surface of the sliding release collar 114 adjacent to the retaining ring indent 116 can be configured to abut the lateral pins 151*a* and 151*b*. To release of the assembly 100 from the valve stem 10, the sliding release collar 114 can be translated rearward in the direction of arrow R1 of FIG. 3A, and press against the lateral pins 151*a* and 151*b*, translating the first and second locking teeth 150*a* and 150*b* rearward and radially outward within the angled slots 146 in the direction of arrow R3 of FIG. 3A, while the interface between the lateral pins 151*a* and 151*b* translates the spring retaining sleeve 120 rearward in the direction of R2 of FIG. 3A and compresses the collar biasing spring 130 against the spring seat 144 as shown in the transition from FIG. 3A to 3B. The translation of the first and second locking teeth 150*a* and 150*b* rearward and radially outward within the angled slots 146 releases contact of the teeth from the threads 14 of the valve stem 10 as shown in FIG. 3B, thereby permitting removal of the assembly 100 therefrom. After the user releases the sliding release collar 114, the force of the collar biasing spring 130 in the forward direction translates the spring retaining sleeve 120 forward, which transfers the spring force through the lateral pins 151*a* and 151*b* into the first and second locking teeth 150*a* and 150*b*, translating the teeth forward and radially inward within the angled slots 146, and which transfers the spring force through the lateral pins 151*a* and 151*b* into the sliding release collar 114, sliding the collar forward until the collar engages with the retaining ring 110. In this position, the assembly 100 is ready to releasably couple to another valve stem for pressurized gas transfer.

Returning to FIG. 1B, the main body 140 can include a series of flats 142 that are exposed in the assembled configuration, and that are intended to be interfaced by a spanner-type tool to hold the main body 140 static while the fitting portion 182 is rotated by a second spanner-type tool, such as during conversion of the assembly 100 between closed- and open-flow, as will be explained in detail below. In this regard, the fitting portion 182 can have a threaded section 180 (threads not shown) to interface with an interior bore of the main body 140, retaining the fitting portion 182 therein. The interface between the main body 140 and the fitting portion 182 can be sealed from contaminants (e.g., dirt, debris, dust, liquids, etc.) by an O-ring 178 positioned between the components in the assembled configuration, e.g., in FIGS. 2A-2C.

The valve stem interfacing opening 149 of the main body 140 is a forward portion of a central passage 141 (see FIG. 3A) of the main body 140 configured to receive internal components of the assembly 100 therein. A shuttle 160 can be positioned forwardmost within the main body 140 and have a shuttle tip portion 163 configured to interface with a poppet 22 (see FIG. 2B) to open gas flow through the valve core 20 of the valve stem 10. The shuttle 160 can further include airflow tip ports 162 through which pressurized gas flows toward the valve stem 10, and a rear interface surface 164 configured to abut a forward interface surface 166 of a closed-flow spool 168 positioned axially rearward of the shuttle 160 within the main body 140. The spool 168 can include a sealing groove 170 configured to receive an O-ring 171 therein, a plurality of lateral airflow ports 172, an annular sealing protrusion 173, and a spring receiving portion 174. During use, as shown in FIGS. 2A and 2B, the annular sealing protrusion 173 is configured to abut an internal closed-flow sealing surface 145 within the central passage 141 of the main body 140. In this position of the closed-flow spool 168, the O-ring 171 is sealed against the internal closed-flow sealing surface 145 such that pressurized gas at a second end portion opening, a receiver 186 (e.g., a hose, pipe, etc. connected to a pressurized gas source, such as a compressor or pressure vessel) of the fitting portion 182 is blocked from flowing to the lateral airflow ports 172, axially inward, and ultimately to the valve core 20. Although the FIGURES depict a fitting portion 182 with a receiver 186 that generally represents a receiver having internal female threads (such as National Pipe Thread (NPT) standard threads) for receiving a threaded male end of a hose/pipe, such an NPT male end, in other embodiments, the fitting portion 182 can by any fitting configuration suitable for attachment to the pressurized gas source, e.g., such as a direct connect hose barb with ferrule, a quick-connect, a swivel connector, etc.

The shuttle 160 and the closed-flow spool 168 are biased forward by a spool biasing spring 176 received within the spring receiving portion 174 of the closed-flow spool 168 and extends to the fitting portion 182, being seated within a spring perch 185 internal to the fitting portion 182. The spool biasing spring 176 can be configured to have a greater spring force then a spring (not shown) of the valve core 20 such that pushing the assembly 100 onto the valve stem 10 first engages the poppet 22 with the shuttle tip portion 163, fully opening the poppet 22 (e.g., to the position shown in FIG. 2B), and thereby the valve core 20, prior to any axial translation of the shuttle 160 and the closed-flow spool 168, which opens the seal at the O-ring 171 and initiates pressurized gas flow through the assembly 100, as shown in FIG. 2C.

During use, the assembly 100 is positioned axially aligned with the valve stem 10 as shown in FIG. 2A, pushed onto the threads 14 at the end of the valve stem 10 such that the threads enter the valve stem interfacing opening 149 of the main body 140 and the shuttle tip portion 163 engages the poppet 22, fully opening the valve core 20 in the position shown in FIG. 2B. In this position, the O-ring 171 is still maintaining a seal between the internal closed-flow sealing surface 145 and the annular sealing protrusion 173, blocking pressurized gas flow from the gas source at the receiver 186 of the fitting portion 182 to the valve core 20. Further, the first and second locking teeth **150*a* and 150*b* may initially engage the threads 14 near the tip of the valve stem 10, providing a preliminary releasable coupling of the assembly 100 to the valve stem 10** before pressurized gas flow is initiated, as described below.

Pushing the assembly 100 further onto the threads 14 of the valve stem 10 as shown in FIG. 2C translates the shuttle 160 in the closed-flow spool 168 rearward, compressing the spool biasing spring 176 and moving the O-ring 171 away from the internal closed-flow sealing surface 145. In some embodiments, opening of the seal at the O-ring 171 permits pressurized gas flow along a closed-flow airflow path AP1 of FIG. 2C, namely, from the receiver 186, through the spool biasing spring 176 and airflow cutouts 184 (see FIG. 1B) of the fitting portion 182, around the O-ring 171, through the plurality of lateral airflow ports 172, through a central opening of the closed-flow spool 168, through a central opening of the shuttle 160, through the airflow tip ports 162, through the valve core 20 and the valve stem 10, and delivering the pressurized gas to, e.g., a tire for inflation.

Figure 4A:
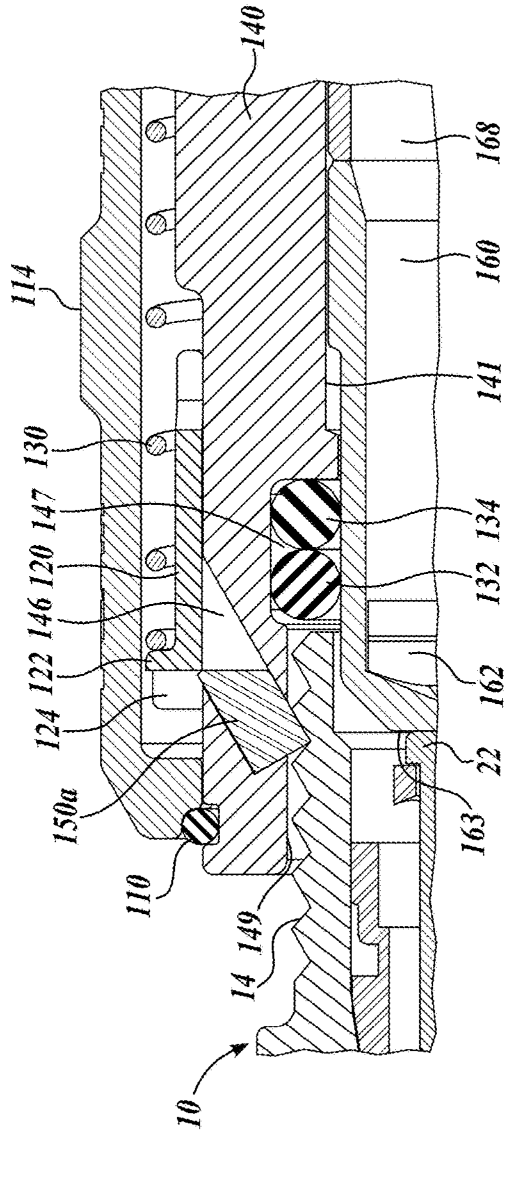
FIGS. 4A and 4B are cross-sectional side views of a portion of the dual-flow air chuck assembly of FIG. 1, showing a seal configuration abutting against an end of a Schrader valve stem.
Figure 4B:
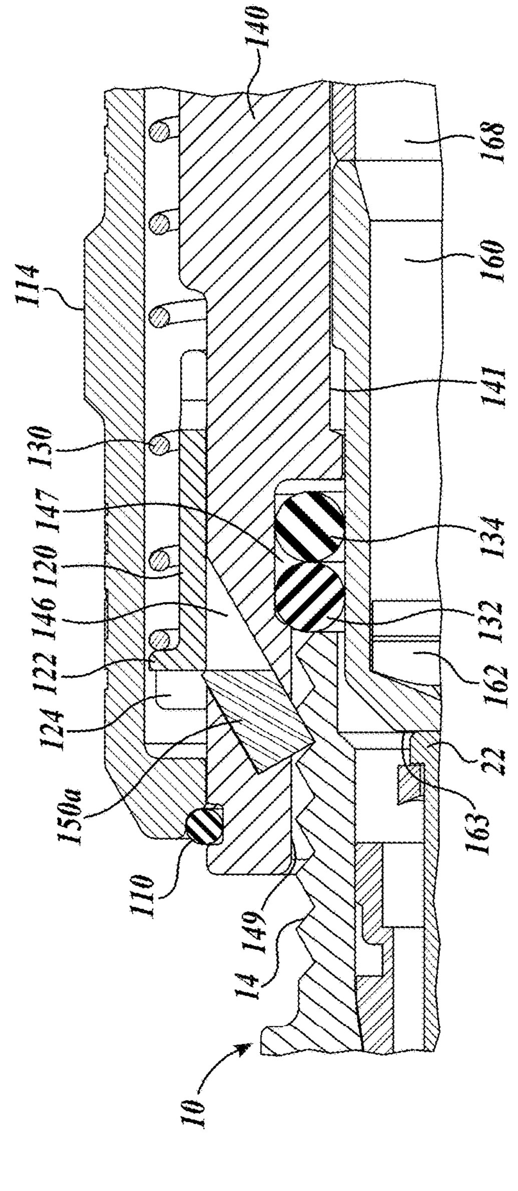

FIGS. 4A and 4B are cross-sectional side views of a portion of the assembly 100, showing a seal configuration abutting against an end of the valve stem 10. As shown in FIGS. 4A and 4B, during inflation using the assembly 100, airflow along the closed-flow airflow path AP1 is prevented from escaping past the threads 14 of the valve stem 10 by a pair of first and second primary sealing O-rings 132 and 134 positioned in an internal bore 147 of the main body 140, which provide a seal against the valve stem 10. The first and second primary sealing O-rings 132 and 134 are permitted to freely slide with low friction within the internal bore 147 and on an outer diameter of the shuttle 160. As shown in FIG. 4A, when the assembly 100 is in the position shown in FIG. 2C and pressurized gas begins to flow, a pressure differential is created with the outside atmosphere due to airflow past the threads 14. This pressure differential causes the first and second primary sealing O-rings 132 and 134 to shuttle toward the end of the valve stem 10 to the position shown in FIG. 4B, and expand in diameter due to the force of the gas pressure. This shuttling and expanding in diameter of the first and second primary sealing O-rings 132 and 134 creates a seal against the end face of the valve stem 10 and the internal bore 147, preventing gas leakage during usage of the assembly 100. In addition, as a result of the length of the internal bore 147 and the size of the first and second primary sealing O-rings 132 and 134, the seal can still be maintained when the assembly 100 is axially misaligned with the valve stem 10 by movement of the O-rings 132 and 134 within the internal bore 147. In this regard, since the pressure differential creates the seal between the O-rings 132 and 134 and the valve stem 10, additional insertion force of the assembly onto the valve stem 10 is not required during axial misalignment. Although the FIGURES depict a configuration having first and second primary sealing O-rings 132 and 134, in other embodiments, the air chuck assembly can have a single primary sealing O-ring within the internal bore 147, or can have more than two primary sealing O-rings within the internal bore 147. In these configurations with one or three or more O-rings, the above-described shuttling and expanding functionality of the O-ring(s) to create the seal with the valve stem is maintained in a similar manner to the configuration depicted. As such, any number of primary sealing O-rings is within the scope of the present disclosure.

Figure 5A:
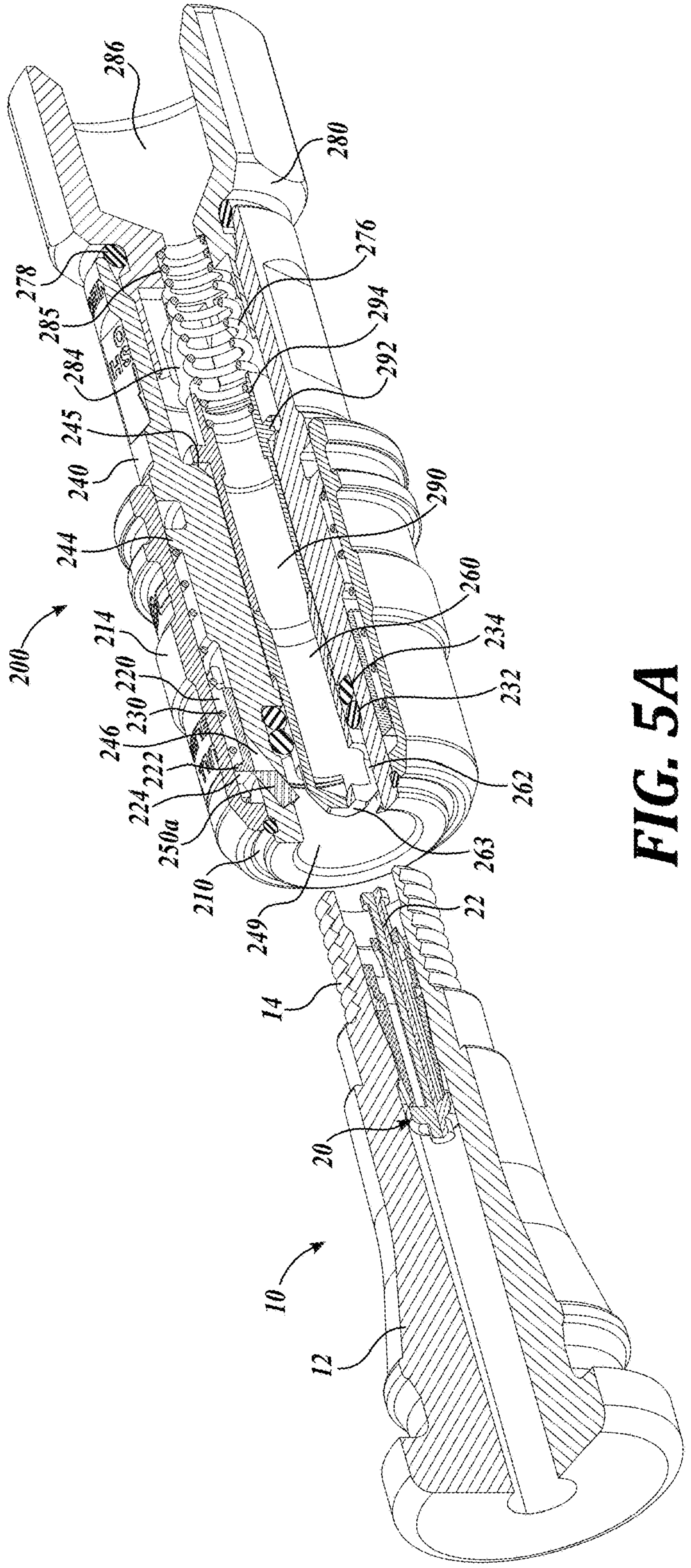
FIGS. 5A-5C are cross-sectional perspective views of a dual-flow air chuck assembly, depicted in an open-flow configuration in accordance with embodiments of the present disclosure, with a 90° section taken axially, and shown with a Schrader valve stem.
Figure 5B:
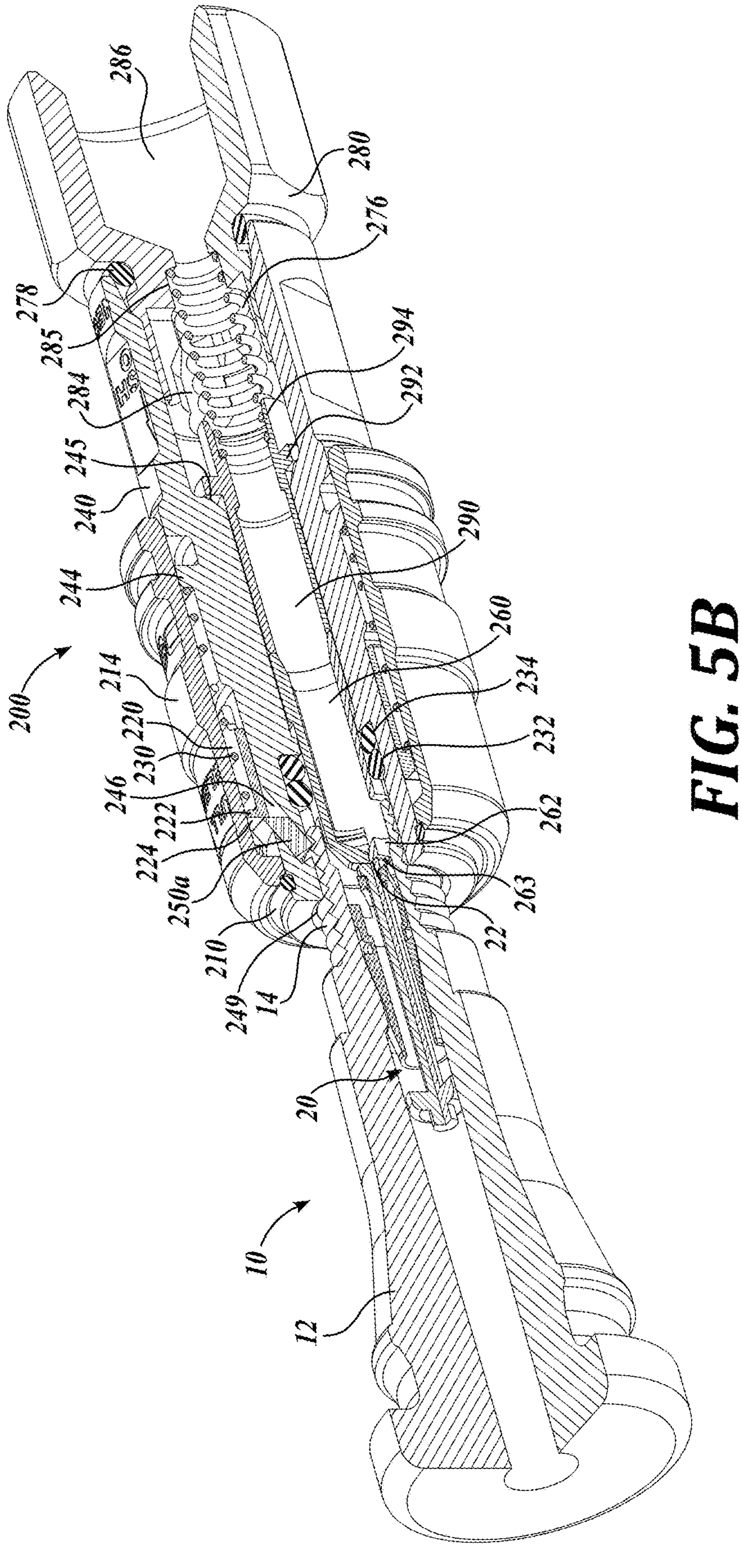
Figure 5C:
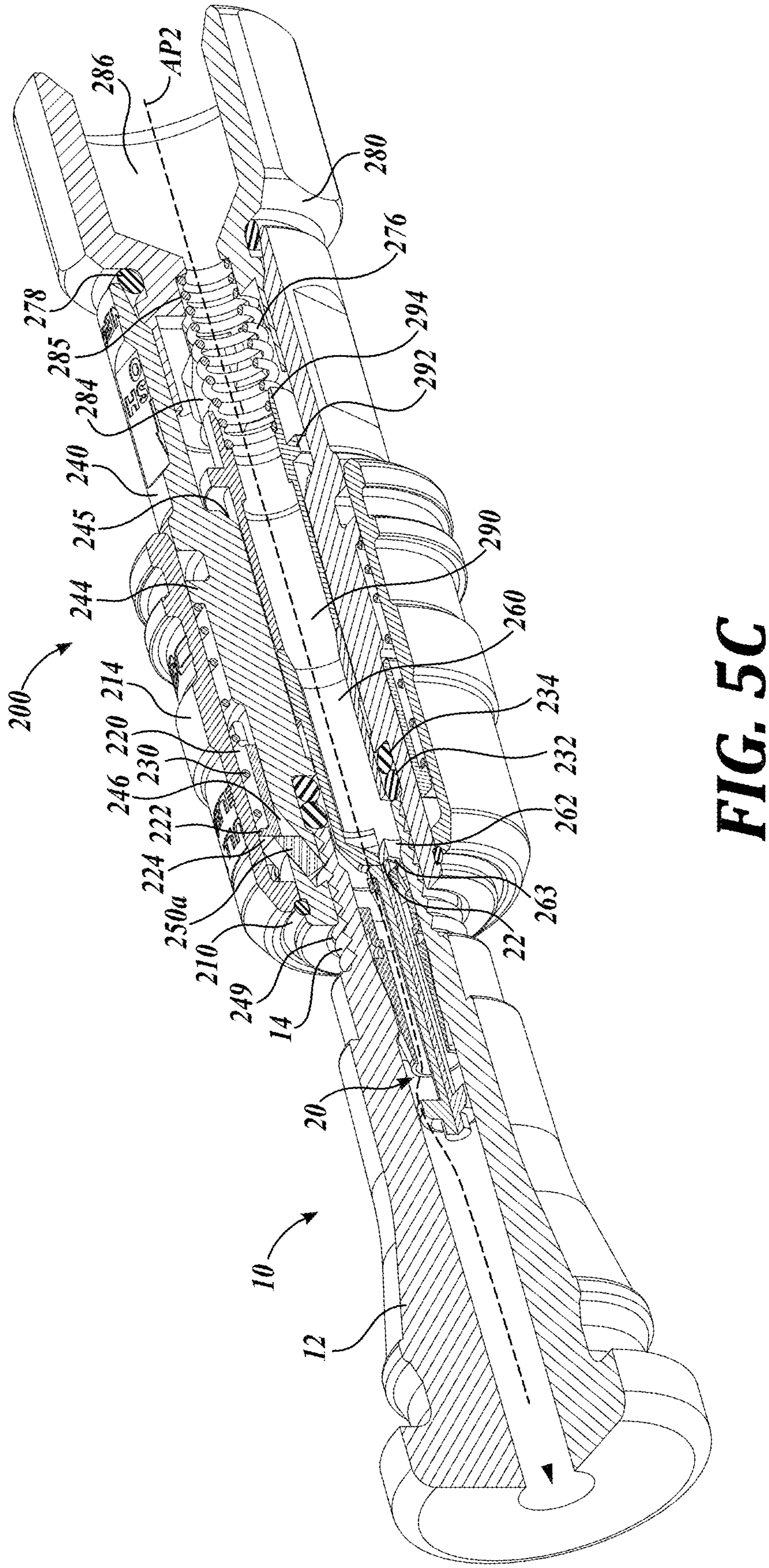

FIGS. 5A-5C are cross-sectional perspective views of a dual-flow air chuck assembly 200 (the "assembly 200"), depicted in an open-flow configuration, in accordance with embodiments of the present disclosure, with a 90° section taken axially, and shown with a valve stem 10. Open-flow operation is generally intended for tire inflators, gauges, and other air inflation systems where the pressurized airflow is controlled, e.g., by a finger-actuated switch, a foot pedal, etc. In use, open-flow operation of the assembly 200 permits the use of a tire pressure gauge while inflating the tire.

The assembly 200 is similar to the assembly 100 shown in FIGS. 1A-2C, except in the open-flow configuration, and includes similar components noted in the 200-series. As such, for conciseness in the ensuing description, several of the 200-series components of the assembly 200 are not reintroduced below, but instead are intended to refer back to the introduction of equivalent components in the 100-series in the description above, except as noted below. For example, the assembly 200 replaces the closed-flow spool 168 of the assembly 100 with an open-flow spool 290 and omits the O-ring 171. In this regard, a user can convert the assembly 100 (closed-flow) to the assembly 200 (open-flow) by unscrewing the fitting portion 182/282, removing the closed-flow spool 168, the O-ring 171, and the spool biasing spring 176/276, and inserting the open-flow spool 290, reinstalling the spool biasing spring 176/276, and screwing on the fitting portion 182/282.

In some embodiments, the open-flow spool 290 can include an open-flow annular protrusion 292 that does not interface with the internal closed-flow sealing surface 245 of the main body 240, and a spring receiving portion 294 for receiving the spool biasing spring 276. Accordingly, even when the open-flow spool 290 is in the position shown in FIGS. 5A and 5B, flow from the pressurized gas source is not blocked by a seal, but instead is permitted to flow freely through a central opening of the open-flow spool 290, such as along an open-flow airflow path AP2 shown in FIG. 5C. To prevent the free flow of the pressurized gas, the assembly 200 is intended for use with air inflation systems where the pressurized airflow is controlled, e.g., by a finger-actuated switch, a foot pedal, etc. All of the aforementioned operations (coupling, removing, etc.) of the assembly 100 apply to the assembly 200, except for the open-flow components.

Figure 6A:
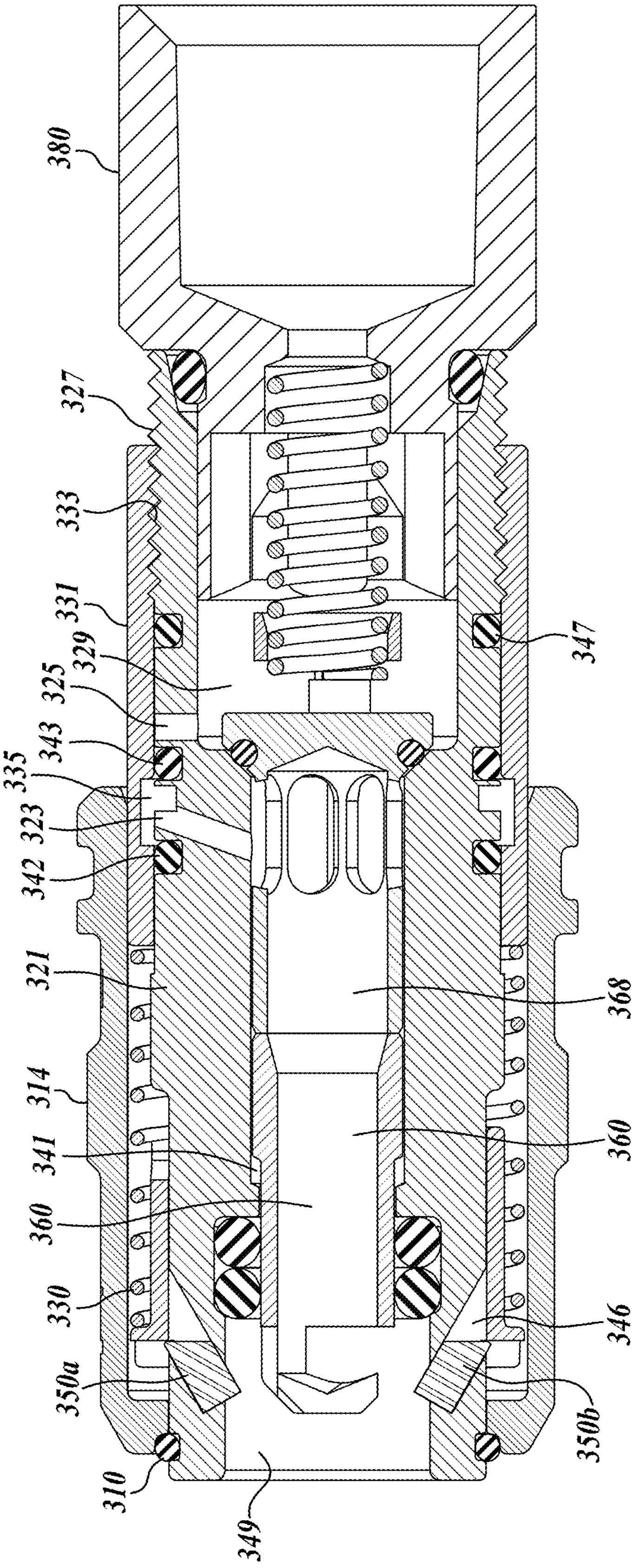
FIGS. 6A and 6B are cross-sectional side views of a dual-flow air chuck assembly in accordance with embodiments of the present disclosure.
Figure 6B:
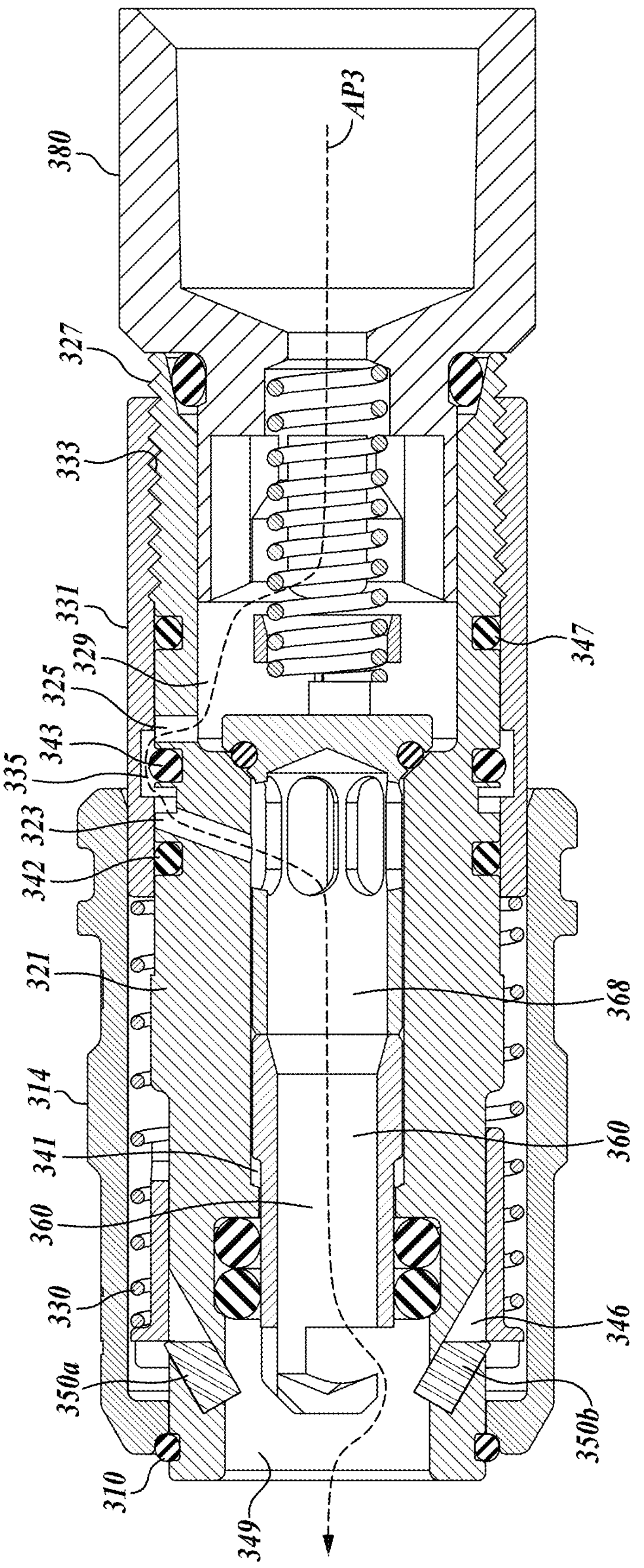

FIGS. 6A and 6B are cross-sectional side views of a dual-flow air chuck assembly 300 (the "assembly 300") in accordance with embodiments of the present disclosure. The assembly 300 is intended to be transitioned between open-flow and closed-flow without disassembly of the components (e.g., removal of the fitting portion 182/282), or swapping of internal components. The assembly 300 is similar to the assembly 100 shown in FIGS. 1A-2C, except in the dual-flow configuration, and includes similar components noted in the 300-series. As such, for conciseness in the ensuing description, several of the 300-series components of the assembly 300 are not reintroduced below, but instead are intended to refer back to the introduction of equivalent components in the 100-series in the description above, except as noted below. For example, the assembly 300 includes a different main body 321 that has a threaded section 327 in place of the series of flats 142, and omits the spring seat 144, among other differences that will be described in detail below.

The assembly 300 includes a flow transitioning collar 331 for converting the assembly 300 between open-flow and closed-flow configurations. The flow transitioning collar 331 can include threads 333 that engage the threaded section 327 of the main body 321 to axially translate the components with respect to each other. The flow transitioning collar 331 extends partially internal to sliding release collar 314, and a front portion of the flow transitioning collar 331 interfaces with the collar biasing spring 330, essentially functioning like the spring seat 144 of the assembly 100. When the flow transitioning collar 331 is in the forwardmost position, as shown in FIG. 6A, the assembly 300 is in the closed-flow configuration. When the flow transitioning collar 331 is in the rearmost position, as shown in FIG. 6B, the assembly 300 is in the open-flow configuration.

Referring first to FIG. 6A, the main body 321 includes a forward radial port 323 extending through an outer surface of the main body 321 into a central passage 341, and a rear radial port 325 extending through the outer surface of the main body 321 into an aft chamber 329 rearward of the spool 368. The flow transitioning collar 331 can include an internal groove 335 positioned near the forward and rear radial ports 323 and 325. The main body 321 also includes grooves configured to receive a first O-ring 342, a second O-ring 343, and a third O-ring 347 therein. The first, second, and third O-rings 342, 343, and 347 are configured to press against an internal surface of the flow transitioning collar 331 to create seals between the main body 321 and the flow transitioning collar 331 during pressurized gas flow through the assembly 300.

In the closed-flow configuration of the assembly 300 shown in FIG. 6A, the flow transitioning collar 331 is in the forwardmost position and the internal groove 335 is positioned in alignment with a radially external end of the forward radial port 323. In this position, the first and second O-rings 342 and 343 are positioned on either side of the internal groove 335 such that pressurized gas cannot flow from the rear radial port 325 to the internal groove 335. In this regard, the second O-ring 343 creates a seal between the forward and rear radial ports 323 and 325. In this position of the flow transitioning collar 331, the assembly 300 is in the closed-flow configuration and behaves as the assembly 100, where pressurized gas is blocked from flowing through the assembly 300 until the spool 368 is axially translated rearward by the interface of the shuttle 360 with the valve core 20, after which the air can flow along a similar path to the closed-flow airflow path AF1 of FIG. 2C.

Next, in the open-flow configuration of the assembly 300 shown in FIG. 6B, the flow transitioning collar 331 is threadedly transitioned to the rearmost position and the internal groove 335 is positioned to span across the forward radial port 323 and the rear radial port 325, permitting airflow therebetween. In this position, the first and third O-rings 342 and 347 maintain their seals, but the position of the internal groove 335 bypasses the seal of the second O-ring 343 such that pressurized gas is permitted to flow through the rear radial port 325, within the internal groove 335 around the second O-ring 343, and through the forward radial port 323 into the spool 368. In this position of the flow transitioning collar 331, the assembly 300 is in the open configuration and behaves as the assembly 200, where pressurized gas is free flowing through the assembly 300 regardless of the position of the spool 368. In contrast to the assembly 200, the airflow travels along an external open-flow airflow path AP3 shown in FIG. 6B, rather than through the open-flow spool 290. All of the aforementioned operations (coupling, removing, etc.) of the assembly 100 apply to the assembly 300, except for the external open-flow components.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone, or "A and B." Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An air chuck assembly for delivering pressurized gas to a valve stem having a valve core, the air chuck assembly comprising:

- a main body including a central passage extending therethrough and having a first end portion opening for interfacing with the valve stem and a second end portion opening for operably coupling to a pressurized gas source;
- a shuttle positioned within the first end portion opening of the central passage, the shuttle having a tip portion configured to interface with a poppet of the valve core to open gas flow through the valve stem;
- a biasing spring extending within the central passage and operable to bias the shuttle away from the second end portion opening toward the first end portion opening, wherein a spring force of the biasing spring is greater than a spring force biasing the poppet of the valve core toward a closed position such that pushing the air chuck assembly onto the valve stem moves the poppet to an open position before the shuttle translates axially toward the second end portion opening, compressing the biasing spring; and
- a closed-flow spool positioned within the central passage in between and abutting the shuttle and the biasing spring, wherein the spool translates axially toward the second end portion opening with the shuttle when the air chuck is pushed onto the valve stem, the closed-flow spool comprising:
  - a sealing protrusion extending radially outward from the spool; and
  - a plurality of lateral airflow ports positioned toward the first end portion opening from the sealing protrusion,
- wherein the central passage further includes a closed-flow sealing surface against which the sealing protrusion abuts when the closed-flow spool is in a closed position, wherein the sealing protrusion is spaced away from the closed-flow sealing surface when the spool translates axially toward the second end portion opening with the shuttle when the air chuck is pushed onto the valve stem.

2. The air chuck assembly of claim 1, wherein the sealing protrusion includes:

- a circumferential sealing groove adjacent to the closed-flow sealing surface in the closed position of the closed-flow spool; and
- an O-ring received within the circumferential sealing groove and configured to abut the closed-flow sealing surface in the closed position such that pressurized gas from the second end portion opening cannot flow to the plurality of lateral airflow ports.

3. The air chuck assembly of claim 1, wherein translating the spool axially toward the second end portion opening positions the sealing protrusion away from the closed-flow sealing surface, permitting pressurized gas flow from the second end portion opening through the plurality of lateral airflow ports, through a port in the tip portion of the shuttle, and to the valve stem.

4. The air chuck assembly of claim 1, further comprising a fitting portion operably coupled to the main body at the second end portion opening for operably coupling the main body to the pressurized gas source, and wherein the closed-flow spool is removable from the central passage by removing the fitting portion from the main body and the biasing spring from the central passage.

5. The air chuck assembly of claim 4, wherein the air chuck is configured to be convertible to an open-flow operation by removal of the closed-flow spool and inserting an open-flow spool.

6. The air chuck assembly of claim 1, wherein the central passage of the main body further comprises:

- an internal bore adjacent to the first end portion opening; and
- a pair of first and second primary sealing O-rings positioned in the internal bore, wherein the pair of first and second primary sealing O-rings are configured to be positioned adjacent to an end of the valve stem when the air chuck is installed on the valve stem.

7. The air chuck assembly of claim 6, wherein the pair of first and second primary sealing O-rings are axially slidable within the internal bore, and wherein the pair of first and second primary sealing O-rings slide toward the end of the valve stem and expand in diameter based on a differential pressure of the gas within the air chuck assembly and the atmosphere in an airflow path past threads of the valve stem.

8. The air chuck assembly of claim 1, wherein the main body further comprises a first angled slot and a second angled slot opposite the first angled slot, the first and second angled slots extending through the main body into the first end portion opening, wherein the air chuck further comprises:

- a first locking tooth operable to slide within the first angled slot radially inward and toward the first end portion opening; and
- a second locking tooth operable to slide within the second angled slot radially inward and toward the first end portion opening, wherein the first and second locking teeth are configured to engage threads of the valve stem received within the first end portion opening to releasably couple the air chuck assembly to the valve stem during gas pressure delivery thereto.

9. The air chuck assembly of claim 8, further comprising a sliding release collar slidingly associated with and at least partially surrounding the main body adjacent to the first end portion opening, wherein the sliding release collar is operable to engage the first and second locking teeth, such that axially sliding the sliding release collar toward the second end portion opening causes the first and second locking teeth slide radially outward away from the threads of the valve stem within the first and second angled slots, respectively, thereby releasing the air chuck assembly from the valve stem.

10. The air chuck assembly of claim 8, further comprising a collar biasing spring operably coupled to the first and second locking teeth, wherein the biasing force of the collar biasing spring urges the first and second locking teeth radially inward into engagement with the threads of the valve stem.

11. The air chuck assembly of claim 10, further comprising a spring retaining sleeve positioned between the collar biasing spring and the first and second locking teeth, wherein the spring retaining sleeve is axially slidable along the main body and has:

a first anti-rotation slot within which a first anti-rotation protrusion of the first locking tooth is received; and a second anti-rotation slot within which a second anti-rotation protrusion of the second locking tooth is received, wherein the interface of the first anti-rotation protrusion within the first anti-rotation slot fixes rotation of the first locking tooth with respect to the spring retaining sleeve, and wherein the interface of the second anti-rotation protrusion within the second anti-rotation slot fixes rotation of the second locking tooth with respect to the spring retaining sleeve.

12. A dual-flow air chuck assembly for delivering pressurized gas to a valve stem having a valve core, the dual-flow air chuck assembly having a closed-flow operation and an open-flow operation, the dual-flow air chuck assembly comprising:

a main body including a central passage extending therethrough and having a first end portion opening for interfacing with the valve stem, a second end portion opening for operably coupling to a pressurized gas source, and a closed-flow sealing surface;

a shuttle axially slidable within the first end portion opening of the central passage, the shuttle having a tip portion configured to interface with a poppet of the valve core to open gas flow through the valve stem;

a closed-flow spool axially slidable within the central passage and positioned abutting the shuttle, wherein the spool translates axially toward the second end portion opening with the shuttle when the air chuck is pushed onto the valve stem, wherein the spool comprises:

a sealing protrusion extending radially outward from the spool and positioned to abut the closed-flow sealing surface when the closed-flow spool is in a closed position, and positioned spaced away from the closed-flow sealing surface when the spool translates axially toward the second end portion opening with the shuttle when the air chuck is pushed onto the valve stem; and a plurality of lateral airflow ports positioned toward the first end portion opening from the sealing protrusion; and a biasing spring extending within the central passage and operable to bias the shuttle and the spool away from the second end portion opening toward the first end portion opening.

13. The dual-flow air chuck of claim 12, wherein the main body further comprises:

a first radial port extending through the main body and into the central passage adjacent to at least one of the plurality of lateral airflow ports;

a second radial port extending through the main body and into the central passage on an opposite axial side of the sealing protrusion from the first radial port;

a first radial groove positioned toward the first end portion opening from the first radial port;

a first O-ring received in the first radial groove;

a second radial groove positioned toward the second end portion opening from the first radial port;

a second O-ring received in the second radial groove; and a flow transitioning collar axially movable along the main body and at least partially surrounding the main body at least adjacent to the first and second radial ports and the first and second radial grooves, the flow transitioning collar comprising an internal airflow groove.

14. The dual-flow air chuck of claim 13, wherein the flow transitioning collar is movable between a closed-flow position for the closed-flow operation of the dual-flow air chuck with the internal airflow groove positioned between the first and second radial grooves, and an open-flow position for the open-flow operation of the dual-flow air chuck with the internal airflow groove positioned extending axially on either side of the second radial groove and adjacent to both the first and second radial ports, wherein, in the closed-flow position, airflow is blocked between the first end portion opening and the second end portion opening until the spool slides away from the closed-flow sealing surface, and wherein, in the open-flow position, airflow is permitted from the pressurized gas source, through the second radial port, within the internal airflow groove past the second O-ring, through the first radial port, and through the plurality of lateral airflow ports of the spook toward the first end portion opening.

15. The dual-flow air chuck of claim 13, further comprising a third radial groove positioned toward the second end portion opening from the second radial port, and a third O-ring received in the third radial groove, the third O-ring sealing the second radial port from the external environment.

16. The dual-flow air chuck of claim 13, wherein the flow transitioning collar is movable between the closed- and open-flow positions by a threaded interface with the main body.

17. The dual-flow air chuck of claim 12, wherein a spring force of the biasing spring is greater than a spring force biasing the poppet of the valve core toward a closed position such that pushing the dual-flow air chuck assembly onto the valve stem moves the poppet to an open position before the shuttle and spool translate axially toward the second end portion opening, compressing the biasing spring.

18. The dual-flow air chuck assembly of claim 12, wherein the sealing protrusion includes:

a circumferential sealing groove adjacent to the closed-flow sealing surface in the closed position of the closed-flow spool; and an O-ring received within the circumferential sealing groove and configured to abut the closed-flow sealing surface in the closed position such that pressurized gas from the second end portion opening cannot flow to the plurality of lateral airflow ports.

19. The dual-flow air chuck assembly of claim 18, wherein translating the spool axially toward the second end portion opening positions the sealing protrusion away from the closed-flow sealing surface, permitting pressurized gas flow from the second end portion opening through the plurality of lateral airflow ports, through a port in the tip portion of the shuttle, and to the valve stem.

20. The dual-flow air chuck assembly of claim 12, wherein the central passage of the main body further comprises:

an internal bore adjacent to the first end portion opening; and a pair of first and second primary sealing O-rings positioned in the internal bore, wherein the pair of first and second primary sealing O-rings are configured to be positioned adjacent to an end of the valve stem when the air chuck is installed on the valve stem.

21. The dual-flow air chuck assembly of claim 20, wherein the pair of first and second primary sealing O-rings are axially slidable within the internal bore, and wherein the pair of first and second primary sealing O-rings slide toward the end of the valve stem and expand in diameter based on a differential pressure of the gas within the dual-flow air chuck assembly and the atmosphere in an airflow path past threads of the valve stem.

22. The dual-flow air chuck assembly of claim 12, wherein the main body further comprises a first angled slot and a second angled slot opposite the first angled slot, the first and second angled slots extending through the main body into the first end portion opening, wherein the air chuck further comprises:

a first locking tooth operable to slide within the first angled slot radially inward and toward the first end portion opening; and a second locking tooth operable to slide within the second angled slot radially inward and toward the first end portion opening, wherein the first and second locking teeth are configured to engage threads of the valve stem received within the first end portion opening to releasably couple the air chuck assembly to the valve stem during gas pressure delivery thereto.

23. The dual-flow air chuck assembly of claim 22, further comprising a sliding release collar slidingly associated with and at least partially surrounding the main body adjacent to the first end portion opening, wherein the sliding release collar is operable to engage the first and second locking teeth, such that axially sliding the sliding release collar toward the second end portion opening causes the first and second locking teeth slide radially outward away from the threads of the valve stem within the first and second angled slots, respectively, thereby releasing the air chuck assembly from the valve stem.

24. The dual-flow air chuck assembly of claim 22, further comprising a collar biasing spring operably coupled to the first and second locking teeth, wherein the biasing force of the collar biasing spring urges the first and second locking teeth radially inward into engagement with the threads of the valve stem.

25. The dual-flow air chuck assembly of claim 24, further comprising a spring retaining sleeve positioned between the collar biasing spring and the first and second locking teeth, wherein the spring retaining sleeve is axially slidable along the main body and has:

a first anti-rotation slot within which a first anti-rotation protrusion of the first locking tooth is received; and a second anti-rotation slot within which a second anti-rotation protrusion of the second locking tooth is received, wherein the interface of the first anti-rotation protrusion within the first anti-rotation slot fixes rotation of the first locking tooth with respect to the spring retaining sleeve, and wherein the interface of the second anti-rotation protrusion within the second anti-rotation slot fixes rotation of the second locking tooth with respect to the spring retaining sleeve.

26. An air chuck assembly for delivering pressurized gas to a valve stem having a valve core, the air chuck assembly comprising:

a main body including a central passage extending therethrough and having a first end portion opening for interfacing with the valve stem and a second end portion opening for operably coupling to a pressurized gas source, the central passage further comprising an internal bore adjacent to the first end portion opening, and a pair of first and second primary sealing O-rings positioned in the internal bore, wherein the pair of first and second primary sealing O-rings are configured to be positioned adjacent to an end of the valve stem when the air chuck is installed on the valve stem;

a shuttle positioned within the first end portion opening of the central passage, the shuttle having a tip portion configured to interface with a poppet of the valve core to open gas flow through the valve stem; and a biasing spring extending within the central passage and operable to bias the shuttle away from the second end portion opening toward the first end portion opening, wherein a spring force of the biasing spring is greater than a spring force biasing the poppet of the valve core toward a closed position such that pushing the air chuck assembly onto the valve stem moves the poppet to an open position before the shuttle translates axially toward the second end portion opening, compressing the biasing spring.

27. The air chuck assembly of claim 26, wherein the pair of first and second primary sealing O-rings are axially slidable within the internal bore, and wherein the pair of first and second primary sealing O-rings slide toward the end of the valve stem and expand in diameter based on a differential pressure of the gas within the air chuck assembly and the atmosphere in an airflow path past threads of the valve stem.

28. The air chuck assembly of claim 26, further comprising a spool positioned within the central passage in between and abutting the shuttle and the biasing spring, wherein the spool translates axially toward the second end portion opening with the shuttle when the air chuck is pushed onto the valve stem.

29. The air chuck assembly of claim 28, wherein the spool is an open-flow spool having a central opening extending axially therethrough and coupling pressurized gas flow between the second end portion opening and the shuttle, wherein the shuttle has a port in the tip portion permitting pressurized gas flow to the valve stem.

30. The air chuck assembly of claim 26, wherein the main body further comprises a first angled slot and a second angled slot opposite the first angled slot, the first and second angled slots extending through the main body into the first end portion opening, wherein the air chuck further comprises:

a first locking tooth operable to slide within the first angled slot radially inward and toward the first end portion opening; and a second locking tooth operable to slide within the second angled slot radially inward and toward the first end portion opening, wherein the first and second locking teeth are configured to engage threads of the valve stem received within the first end portion opening to releasably couple the air chuck assembly to the valve stem during gas pressure delivery thereto.

* * * * *